(12) United States Patent
Belkin et al.

(10) Patent No.: US 7,640,009 B2
(45) Date of Patent: Dec. 29, 2009

(54) METHOD AND APPARATUS TO PROVIDE A SELECTABLE CALLER IDENTIFICATION

(75) Inventors: Anatoly S. Belkin, Glenview, IL (US); Alex P. Hirsbrunner, Bloomingdale, IL (US)

(73) Assignee: Motorola, Inc., Schaumburg, IL (US)

( * ) Notice: Subject to any disclaimer, the term of this patent is extended or adjusted under 35 U.S.C. 154(b) by 1128 days.

(21) Appl. No.: 10/609,790

(22) Filed: Jun. 30, 2003

(65) Prior Publication Data

US 2004/0266415 A1    Dec. 30, 2004

(51) Int. Cl.
  *H04M 3/42* (2006.01)
(52) U.S. Cl. .................................... 455/415; 455/417
(58) Field of Classification Search .............. 455/418, 455/445, 415, 456.1, 417, 414.1
  See application file for complete search history.

(56) References Cited

U.S. PATENT DOCUMENTS

| | | | | |
|---|---|---|---|---|
| 5,898,770 | A * | 4/1999 | Valentine | 379/249 |
| 5,987,113 | A * | 11/1999 | James | 379/211.01 |
| 6,167,119 | A * | 12/2000 | Bartholomew et al. | 379/88.04 |
| 6,212,372 | B1 * | 4/2001 | Julin | 455/418 |
| 6,590,965 | B1 * | 7/2003 | Poole et al. | 379/88.19 |
| 2001/0002209 | A1 | 5/2001 | Han | |
| 2002/0080928 | A1 * | 6/2002 | Bates et al. | 379/88.21 |
| 2003/0027559 | A1 | 2/2003 | Umstetter et al. | |
| 2003/0181209 | A1 * | 9/2003 | Forte | 455/445 |
| 2004/0008834 | A1 * | 1/2004 | Bookstaff | 379/218.01 |

FOREIGN PATENT DOCUMENTS

| | | |
|---|---|---|
| JP | 7274255 A | 10/1995 |
| JP | 9037314 A | 2/1997 |
| WO | WO 01/19059 A | 3/2001 |

* cited by examiner

*Primary Examiner*—Joseph H Field
*Assistant Examiner*—Huy D Nguyen

(57) ABSTRACT

A network controller (200, 300) corresponding communication device (400) and method for providing a caller identification to a called party comprises a receiver (202) for receiving a communication and a corresponding first identifier from a communication device (400), a controller for selecting a second identifier from a plurality of identifiers, each of the plurality of identifiers corresponding to the communications device (400), and a transmitter (204) coupled to the controller for providing the second identifier as the caller identification to the called party. The communication device (400) may be used to select the second identifier as well as signal a second communication infrastructure (300) to block calls before forwarding from the second communication infrastructure (300) to the first communication infrastructure (200).

15 Claims, 4 Drawing Sheets

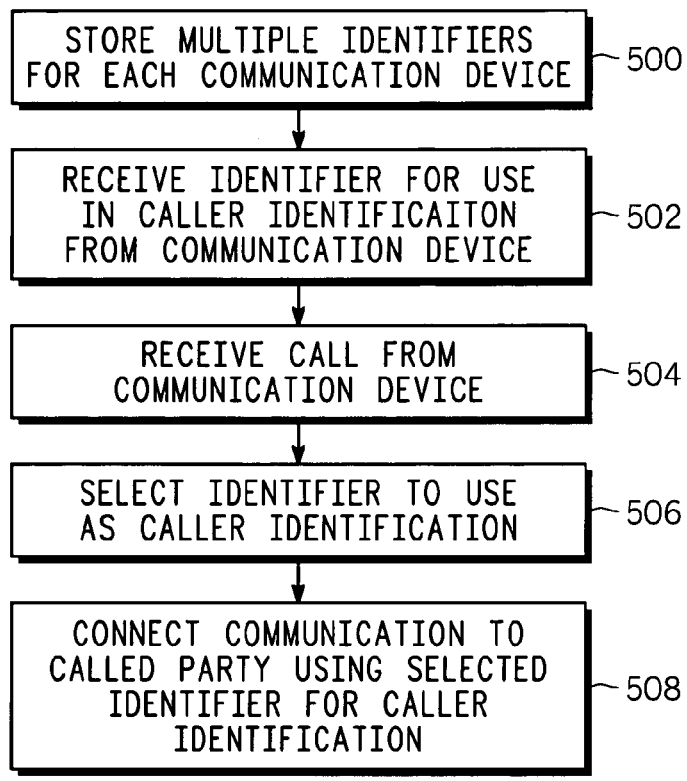
*FIG. 5*
*FIG. 6*
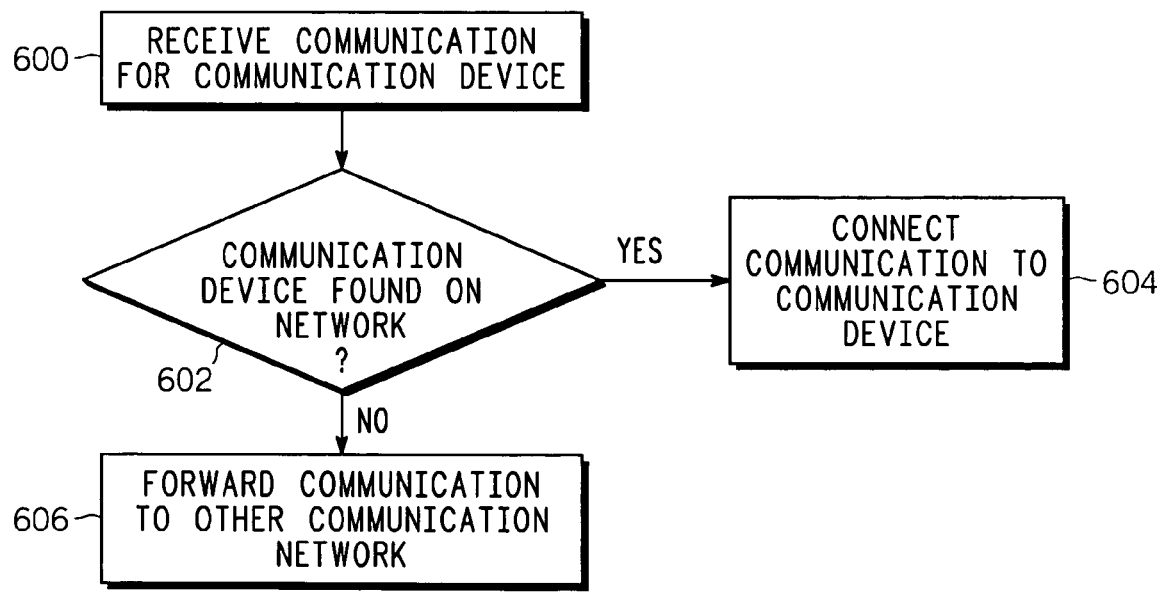

US 7,640,009 B2

METHOD AND APPARATUS TO PROVIDE A SELECTABLE CALLER IDENTIFICATION

FIELD OF THE INVENTION

This invention relates in general to communication systems, and more specifically to a method and apparatus for providing a selectable caller identification.

BACKGROUND OF THE INVENTION

Communication devices that operate on multiple communication networks exist. It most cases, the communication device operates on a first network that is locally oriented and supported by a private network. For example, a corporation can use its computer network to support low power transceivers, using a protocol such as IEEE 802.11 (Wi Fi), for providing wireless communications to a communication device while it is in the coverage area of the transceivers. When the communication device does not have access to the corporate or enterprise network it can use a public network, such as a cellular network for sending and receiving communications. Such a communication device will typically have two telephone numbers for receiving calls, for example, one for the enterprise network and one for the public network. When the user makes a call using the enterprise network or the public network, the enterprise phone number or the public network phone number is, respectively shown as the caller identification (caller ID) to a called party. The public network number may be the user's personal number where the user does not want to receive business calls returned to that number. Clearly a need exists for a method and apparatus to display an enterprise caller identification when making calls using a public network.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 5 is a flowchart for displaying an enterprise number as a caller identification from a public network; and FIG. 6 is a flowchart for receiving a return communication when an enterprise number is used as a caller identification.

DETAILED DESCRIPTION OF PREFERRED EMBODIMENT

Figure 1:
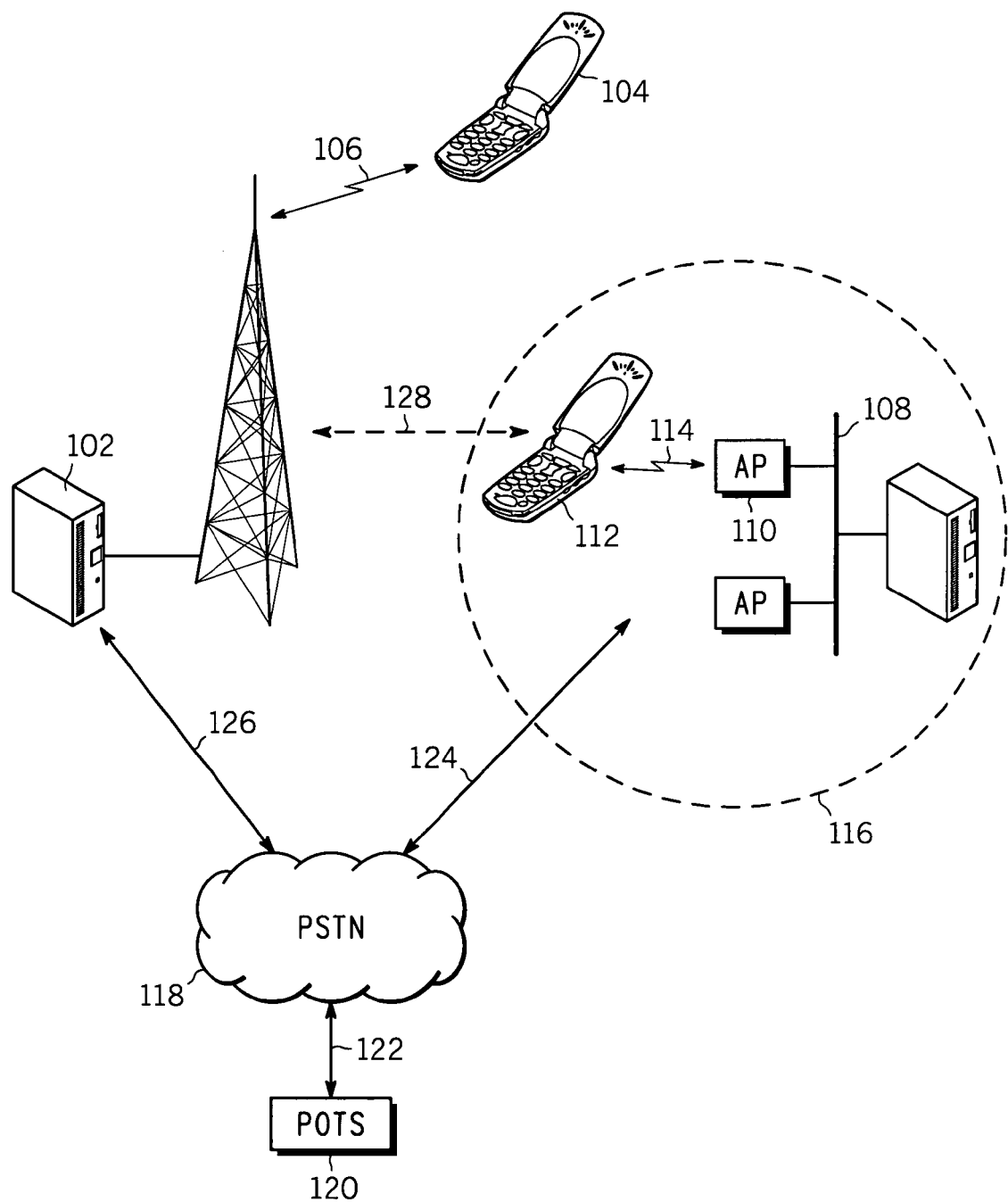
FIG. 1 depicts, in a simplified and representative form, a block diagram of a plurality of communication networks and interconnections thereof.

In overview, the present disclosure concerns communication devices that operate on multiple networks and more specifically to the networks and equipment therein including network controllers. More particularly various inventive concepts and principles embodied in methods and apparatus for the use and management of caller identification as a means to direct calls to lower cost networks along with providing an opportunity to screen or block calls from being forwarded during certain conditions or circumstances are discussed. The principles discussed are applicable to many communications systems, including those having the same nature or composition but are of particular interest when one network is a public wireless carrier, such as a cellular service carrier, and the other network is a private communication system as supported, for example, on a corporation's enterprise wireless local area network.

As further discussed below various inventive principles and combinations thereof are advantageously employed for selecting which of a communication device's several identities will be used when making a call or sending another form of communication where a caller identification is made available to the receiver of the call. Calls returned to the communication device using the provided caller identification will be made to the network of choice rather than always to the network of origin. When such return calls are made, for example, to an enterprise network supporting flexible call routing options, decisions regarding forwarding the call to the communication device or rerouting to another enterprise resource can be made. This allows considerable flexibility in both managing cost and affording workers a measure of privacy in receiving unwanted calls during non-work hours and, conversely, assuring that important calls are forwarded in any circumstance.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Referring to FIG. 1, a simplified and representative block diagram of a plurality of communication networks and interconnections thereof will be discussed and described. A network controller 102, as part of a communication infrastructure, communicates with a communication device 104 over a communication channel 106. A number of protocols for the communication channel 106 exist including but not limited to, for example, CDMA, TDMA, GSM and 3G. Often this network is a wireless wide area network (WAN) as is known.

Calls or other communication, such as short message service (SMS) messaging, can be received over wide areas, in some cases globally, when the network controller 102 is so designed and constructed. A public, e.g. commercial network operator or carrier typically owns the network controller 102 supporting one or more of the above protocols. Charges for using the communication channel 106 can vary based on the connection time, number of packets transferred or other criteria, but almost certainly involve a cost or a contractual relationship.

In contrast, another communication infrastructure or local network 108 is often built around a corporate enterprise-wide computer network and may not involve separate connection time or packet transfer charges. The local network 108 comprising an access point 110 or plurality of such access points, connected by the corporate network to another network controller 300, provides wireless communication services to a communication device 112 over a comparatively short-range communication channel 114. This local network is often called a wireless local area network (WLAN). The communication channel 114 is often one of the several widely recognized commercially available protocols including, for example, 802.11 (WiFi), Bluetooth, HiperLan, etc. As long as the communication device 112 is within a coverage area 116 of the access point 110 or plurality of access points it can send and receive communications over the local network 108. Since there are often no separate usage or connection time charges and much of the local network 108 infrastructure exists for other purposes, a corporation can have an economic incentive to use the local network 108 when possible. In an alternate embodiment, the first and second communication channels 106, 114 may use the same or a similar protocol. Thus the two networks serving the communication devices 104, 112 may both be WANs or WLANs and hence identical or similar from an equipment perspective. The choice of which network is chosen even if both are WANs or WLANs can be based on economic concerns that is, the lower or lowest cost, or other factors such as reliability.

A public switched telephone network (PSTN) 118 supports communication with a plain old telephone set (POTS) 120 over a connection 122 that is typically wired but can include wireless portions, voice over Internet Protocol (VoIP) or other communication transport mechanisms. When the PSTN 118 and the local network 108 are coupled by a connection 124, calls or other communication made over the communication channel 114 can be connected outside the corporate or enterprise environment. Typically, the network controller 102 is connected at 126 to the PSTN. Calls and other communications can be sent to and from any device 104, 112, 120 having access to their corresponding networks 102, 108, 118. A class of devices has been contemplated that are able to communicate on more than one network. Some communication devices, such as 112, can be made to operate on either the first communication channel 106 via the network controller 102 or second communication channel 114 via the local network 108. Communication devices capable of supporting multiple communication infrastructures and protocols are available from manufacturers, such as Motorola, Inc.

The other elements of FIG. 1 are known and available. The communication infrastructure for wide area networks is represented by systems available from Motorola as exemplified by the iDEN™ communication system or other cellular systems. The network controller 102 is part of the communications infrastructure that typically also includes a radio access network, base site controllers and switches, among other equipment. The network controller 102 may be integral to one of these components, such as the switch, but can also be a distinct element of the communication infrastructure. The PSTN can be a standard wireline telephone infrastructure including switches, routers and the like and are available from companies such as Lucent and Tellabs. The plain old telephone set 120 is available from AT&T and other manufacturers at retail outlets nationwide. Communication devices similar to POTS, but serving the same function using Integrated Services Digital Networks, voice over Internet Protocol or wireless handsets may also be serviced by the PSTN network in alternate embodiments. Such equipment is available from communications suppliers and computer dealers.

Figure 2:
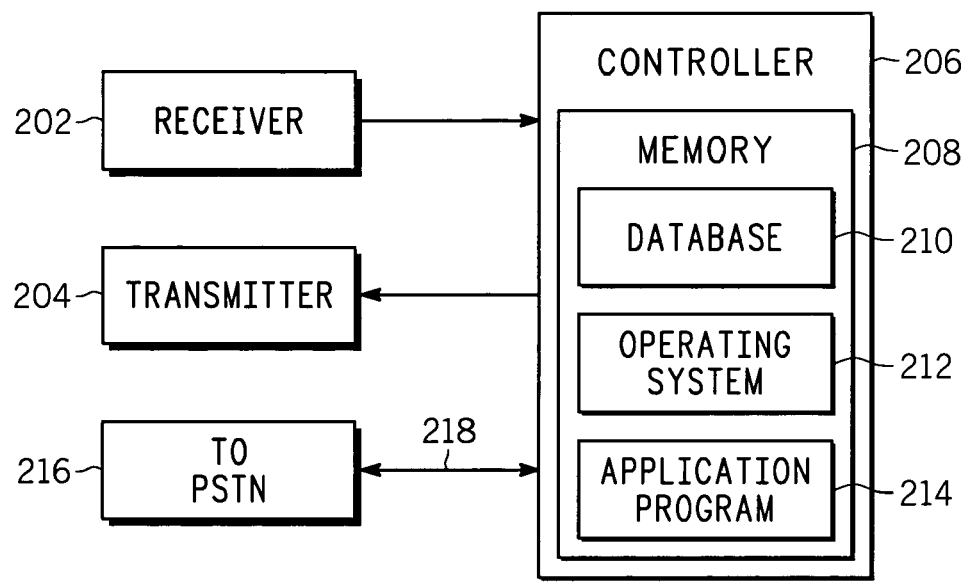
FIG. 2 depicts, in a simplified and representative form, a block diagram of a network controller for use as part of a public wireless network.

Referring to FIG. 2 a simplified and representative block diagram of a network controller 200 used for part of a public wireless network is discussed and described. The network controller 200 is the same as or similar to the network controller of FIG. 1. A receiver 202 and transmitter 204 together are a transceiver that operate to couple the network controller to other elements of the communication infrastructure, such as base stations, possibly base station controllers and land line networks, etc. The network controller 200 may be comprised in or associated with a base station controller (BSC), mobile switching center (MSC), or combination BSC/MSC and can be viewed as the controlling entity for the wireless wide area network. The receiver 202 and transmitter 204 are connected to a controller 206 that can perform or be coupled with a further controller for performing a variety of back-end functions for call management, billing, provisioning, etc. Components of the controller include a memory 208 including both volatile and non-volatile elements including a database 210 for managing user data, operating system 212 for providing the operations environment, and application programs 214, if present, such as billing, user provisioning and special features. The controller is coupled to a public switched telephone network 216 (PSTN) via a connection 218, usually a trunked circuit connection.

As discussed above, the network controller 200 can be obtained through suppliers such as Motorola, Inc. The controller 206 can be a computer and peripherals such as are available from Sun Microsystems or Hewlett Packard that is executing software to perform the requisite tasks. The memory, both volatile and non-volatile, is commercially available and can include semiconductor and magnetic or rotating media. The operating system 212 can be Sun Solaris, HPUX or another variant of UNIX. Other operating systems can be used in alternate embodiments such as Windows from Microsoft, or other embedded operating system. The database program can be obtained commercially from a number of vendors such as Oracle. The database application can be purchased or internally developed by those with ordinary skill in database application development. Application programs 214 for supporting the fixed end operations associated with the communication device 104 are available from the infrastructure supplier or from providers such as Logica. The application programs 214 may be written in a number of languages including C, C++ and Java.

In operation, the network controller 200 provides caller identification to a called party and comprises several operational elements including the receiver 202 for receiving a communication and a corresponding first identifier, e.g. phone number, from a communication device 104. In one embodiment, the network controller comprising the receiver 22 is a portion of a public wireless network, such as Nextel. A public network may be defined in one context as providing network access services to a user on a subscription basis or as a marketing incentive. For example, Starbucks may offer network access to patrons in their stores. A private network can be defined as a network where the user is affiliated with the network owner/operator, for example, an employee, and network access is provided at no charge to the user. The first identifier may be the telephone number of the calling device or another identifier for the communication device 104 such as an international mobile equipment identifier (IMEI).

The communication is forwarded to the controller 206 that is coupled to the receiver 202. The network controller 200 will normally present as a caller identification the primary telephone number the network controller 200 associates with the communication device 104, in this instance, the first identifier. When the communication device 104 is able to operate on more than one infrastructure, the controller 206 advantageously according to the present invention can select a second identifier from a plurality of identifiers, for example, from a database 210. Each of the plurality of identifiers corresponds to the communication device 104, specifically to a number or identifier that can be used to address the communication device 104 for each of the networks on which the communications device is operable. This second identifier, e.g. selected identifier, is provided as the caller identification to the called party via the transmitter 204. In this instance and for the purpose of description, the second identifier is not associated with the network controller 200. The provisioning of such an identifier requires changes to the database 210 and to the operational procedures used to provision a communication device for operation.

In an embodiment where the called party is a POTS 120 or another destination accessed through the PSTN 216, the transmitter 204 may be wholly or partially coupled to the PSTN 216 and the second identifier is used as the caller identification for such calls.

The result of changing the caller identification from a first identifier to a second identifier is that when received by the called party, the caller identification can be used to make a reply call to the communication device 104 via a different communication path from the communication infrastructure that originated the call. In some embodiments it is likely the receiver 202 will not be operable to receive a communication addressed to the communication device 104 that uses the second identifier as an address. If a call made to the communication device 104 is addressed to the device at a second infrastructure 108, in order for the call to reach the communication device 104 it would, in this case, need to be forwarded to the network controller 200 and its receiver 202 addressed with the first identifier.

In one embodiment, the network controller 200 may always perform the substitution of caller identification, specifically replace the first identifier with the second identifier. In another embodiment, the receiver 202 is also operable to receive a signal from the communication device 104 indicating which of the plurality of identifiers for the controller to select as the second identifier. This can be performed by pre-pending a number to the called phone number, such as #1#<phone number>, for the first identifier and #2#<phone number> for the second identifier. Alternately, the communication device can notify the network controller 200 via a web site or wireless application protocol (WAP) site. This is useful when the user of the communication device 104 wants to change the communication channel 106, 114 to which a reply call will be made, perhaps overriding a default setting.

Figure 3:
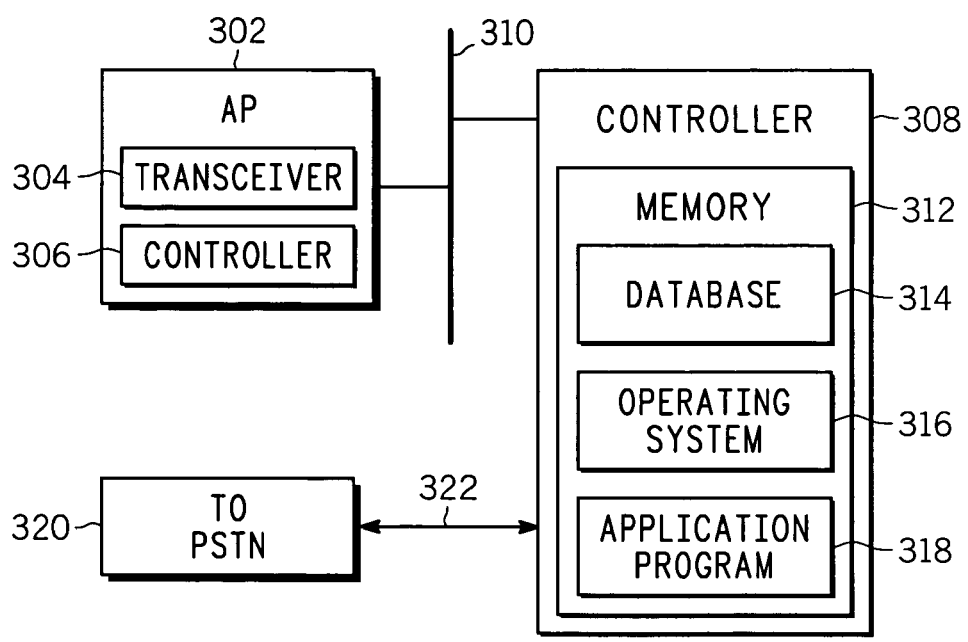
FIG. 3 depicts, in a simplified and representative form, a block diagram of an other network controller for use as part of a private network.

Referring to FIG. 3, a simplified and representative block diagram of an other network controller 300 for use as a part of a private network is discussed and described. An access point 302 comprises a transceiver 304 and an A/P controller 306. The access point 302 provides a radio frequency communication channel 114 with a communication device 112. The transceiver 304 is typically a low power unit for short-range communication over unlicensed Industrial, Scientific and Medical (ISM) band radio frequencies. The communication protocol used is often either IEEE 802.11 (WiFi) or Bluetooth or others that are being developed and deployed.

The network controller 300 supports communication using any of several protocols and configurations. For example, all of the following may be used for completing communication connections: a virtual private network, a local network, a commercial wireless hotspot, and a private network. The virtual private network can be a sub-set of a larger network where the sub-set is operated to give the appearance of existing separately from others using the same network. A local network may be a commercial enterprise supplying a service, for example, telephone service to an apartment building. Commercial hotspots, such as networks sponsored by Starbucks coffee shops offer a wireless connection for patrons, sometimes for a subscription fee. As opposed to the above variations of public networks, a private network is typically one operated solely for constituents of some group, such as employees of a business.

The access point 302 may be one of several physically arranged around a building or other area to provide radio coverage to one or more communication devices. The A/P controller 306 translates packet information communicated over a network 310 to and from the appropriate RF communication protocol. The A/P controller 306 also monitors signal strength and may function as part of a handoff strategy between the access point 302 and neighboring access points (not shown) when the communication device moves from one area to another. For example, when a device moves from a conference room at one end of a hall to an office at the other end. The access point 302 is known and available from manufacturers such as Proxim.

A controller 308 is used for managing the other tasks associated with supporting communication via the network controller 300. The controller 308 comprises a memory 312 for storing information such as a database 314, the operating system 316 and one or more application programs 318. The controller 308, in order to complete communication links to parties outside the local network 118 is coupled to a public switched telephone network 320 via a communication channel 322, such as a trunked circuit.

The network controller 300 is typically a server available from a number of sources. For example, in a typical embodiment it is a server running a variation of UNIX, such as a Sun Computer server running Solaris. The application programs 318 can have several purposes including support for the operation of the system for example, record keeping and handoff management, and may be written in C, C++, Java or the like. The memory 312 is known and available and may be either solid state or rotating media. One or more of these programs will require modifications in accordance with the principles and concepts discusses and disclosed herein.

In operation, the network controller 300 is utilized for receiving and routing the communication to the communication device 112 and advantageously comprises the database 314 with a plurality of identifiers corresponding to the communications device 112. Each of the plurality of identifiers typically corresponds to different networks or the different communication channels 106, 114 that can be used to support communication with the communication device 112. The identifiers are provisioned in the database 314 at the time the communication device is provisioned or when a second network capability is enabled for the communication device 112. It is likely that this is a system administration function although a web-based or WAP-based self-provisioning is also envisioned. The network controller 300 also comprises the transceiver 304, or a simple receiver in some embodiments, for receiving the communication from a sender and a corresponding first identifier. The first identifier is most commonly the identifier associated with the communication device 112 for the network controller 300 or corresponding network, e.g. a WLAN identifier. This is in contrast to the description of FIG. 2 wherein the first identifier was associated with network controller 200, i.e. a WAN identifier. The transceiver 304, or in some embodiments a simple transmitter, is used for coupling the communication to the communication device 112 using the first identifier when the communication device is found in a coverage area of the communication infrastructure 300. For example, when a call is made to the communication device 112, the network controller 300 will preferably always try to complete the call using its own local network.

Also an element of the network controller 300 is a controller 308, coupled to the database, the receiver, and the transmitter all cooperatively operating, for routing the communication to the communication device 112 using an other communication channel, such as 106, with a second identifier when the communication device is not found in the coverage area. The other communication network can be a public cellular network where the second identifier is a cellular telephone number. The communication is routed to the other communication network by forwarding the communication to the cellular telephone number.

The controller 308 is programmable to block calls to the communication device by one of a system setting and a signal from the communication device. Such a request can be made by a user of the communication device 112 in the case where the second identifier, or cellular number is the user's private cell phone number and calls forwarded from the network controller 300 or work are blocked on weekends. A system manager may also be able to set up such blocking or forwarding based on other criteria such as the origin of the communication.

Figure 4:
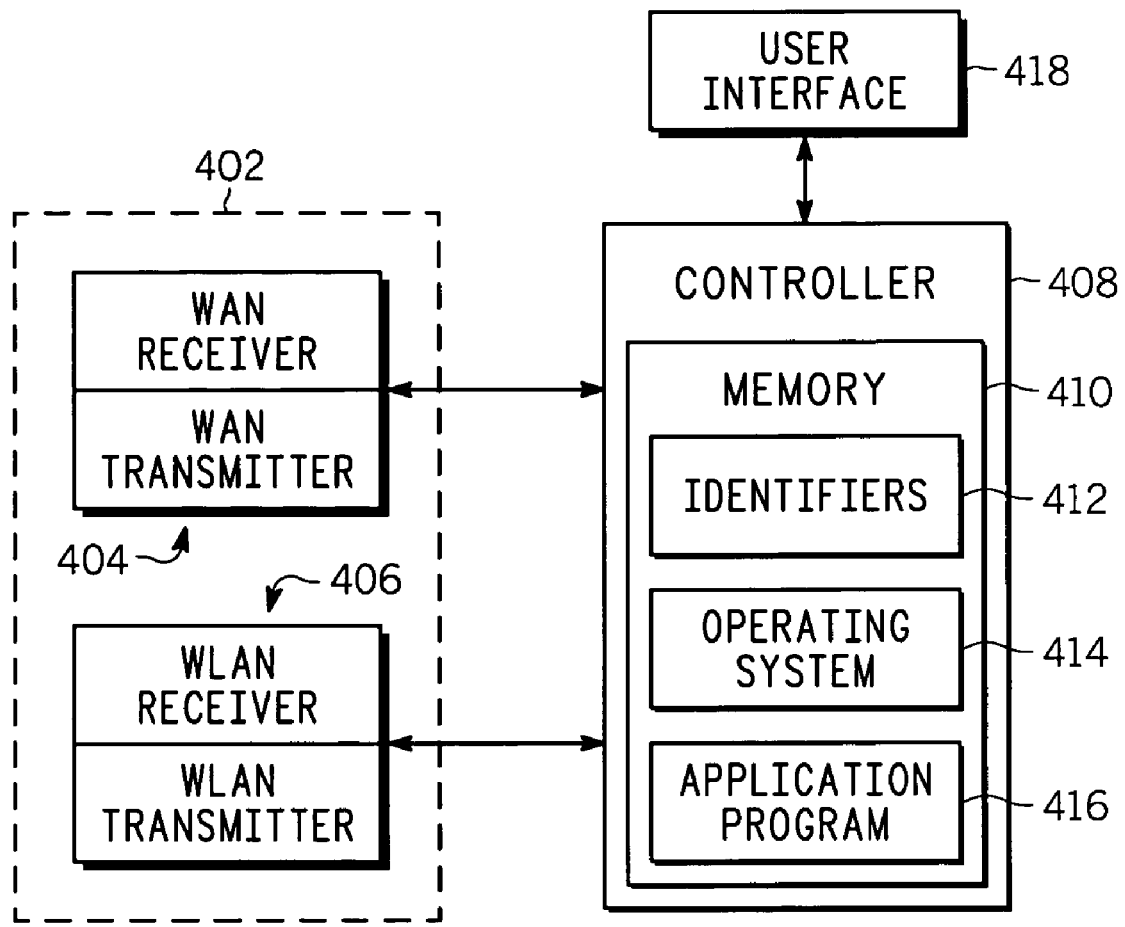
FIG. 4 depicts, in a simplified and representative form, a block diagram of a communication device.

Referring to FIG. 4 a simplified and representative block diagram of a communication device 400 is discussed and described. This device is similar to the communications devices 104, 112. A transceiver apparatus 402 comprises a wide area network (WAN) transmitter and receiver 404 for use with, for example, a cellular telephone network or other wireless wide area network. The transceiver apparatus 402 also comprises a wireless local area network (WLAN) transmitter and receiver 406 for use with a local enterprise or other similar short-range wireless network, such as 108.

As covered in the discussion of FIG. 1, it is not necessary that the transceiver apparatus 402 be comprised of WAN 404 and WLAN 406 transceivers. When the over the air protocols for corresponding channels 106, 114 are the same or similar, the transceiver apparatus may be comprised of a single transceiver capable of supporting both over the air protocols. When the over the air protocols are similar but require separate transceivers the transceiver apparatus can be comprised of two WAN transceivers, or two WLAN transceivers. As networks evolve, the transceiver apparatus may include a multiplicity of transceivers.

The transceiver apparatus 402 and its constituent components 404, 406 are coupled to a controller 408. The controller comprises a memory 410 for storing information such as identifiers 412, for example telephone numbers or other identifier numbers or addresses, such as SIP identities used for calling the communication device 400. The memory is also used to store the communication device 400 operating system 414 and any application programs 416 that may be installed.

A user interface is provided, coupled to the controller, supporting interaction with the user of the communication device 400.

The communication device 400 is similar or identical to the communication device 112 and is available from manufacturers like Motorola, however the functionality of these devices will need to be modified according to the principles and concepts disclosed and described herein in order to enjoy the advantages noted. The WAN receiver and transmitter 404 are typical in the commercial cellular industry and are available as components from companies such as Motorola. The WLAN receiver and transmitter 406 are typically IEEE 802.11 (Wi Fi) compliant and are available as a chip set from Proxim or Motorola and other manufacturers. The controller 408 is or may include a digital signal processor, available from Motorola's Semiconductor group or other vendors. The memory 410 can include both volatile and non-volatile memory and is often integral to the controller 408 but may also be external. The user interface comprises in general a display, keypad, and audio circuitry. The user interface is comprised of commodity products readily available.

In operation, the communication device 400 is arranged and constructed for use with a plurality of communication networks and comprises the memory 410, the controller 408, and the transceiver apparatus 402. The memory 410 is for storing a plurality of identifiers corresponding to the communication device 400. The controller 408 is coupled to the memory and is operable for selecting one of the plurality of identifiers for providing as a caller identification when making a call. The transceiver apparatus 402 is coupled to the controller 408 and provides to one of the plurality of network controllers 200, 300 for the respective communications networks the selected one of the plurality of identifiers for use as a caller identification. The transceiver apparatus 402 is operable to communicate on each of the plurality of communication networks. The plurality of identifiers comprises a unique identifier for each of the plurality of communication networks that is recognized by the respective network controllers 200, 300. Note that the identifier selected can be forwarded to each of the networks in a variety of manners, including via a phone call or other process, such as a call from the device resulting in the database for the network being programmed. The plurality of communication networks as earlier noted may be any of various public or private wired or wireless networks. The communications device 400 typically also includes and uses the user interface 418 for displaying the plurality of identifiers wherein the controller 408 is responsive to a user indication or selection of the one of the plurality of identifiers for use as the caller identification. The selection of one of the plurality of identifiers, for use as the caller identification can be based on economic considerations for receiving a response communication. To illustrate, a user of the communication device 400 may be outside the coverage area 116 of his or her office's local communication infrastructure or network 108, but expects to return shortly. A call made from the user's communication device 104 using the wide area communication network and network controller 102, for example, a cellular network, to a phone 120, and having a caller identification corresponding to the network controller 102 is likely to be returned via the network controller 102 and channel 106.

As discussed above, calls made over the WAN system and communication channel 106 may be significantly more expensive than calls made over a WLAN communication channel 114. In a similar scenario, a call is made from the communication device 104 to the phone 120 but the second identifier, the number for contacting the device via the WLAN channel 14, is provided as the caller identification. The network controller 102 must be provisioned with this second identifier and will typically involve a contractual relationship with an entity associated with the WLAN communication channel 114 owner or operator. The returned call will be made via the WLAN communication channel 114 thereby saving the cost of using the WAN communication channel 106. Should the communication device 400 not be reachable by the WLAN communications channel 114, the network controller 300 may forward via the PSTN or other link, not shown, the call to the wide area communication channel 106 via the network controller 102. In some cases, it may not be desirable to forward the call in this manner, for example, if the worker with the communication device 400 has left for the weekend and the call is not urgent.

The controller 408, at the request of the user, is then able to send a signal to one of the plurality of communication networks or channels, for example the WLAN communication channel. Since this may be the primary point of contact for the communication device 400, this can also be the network of choice for programming changes in operational characteristics. The signal can indicate that the local network controller 300 is to prevent communications from being forwarded to the communication device 400 or conditionally prevent such forwarding, e.g. for two days or six hours, etc. The signal in question can range from a dual tone multiple frequency (DTMF) response to a interactive response system supported by the network controller 300. The signal may also be conveyed via a web-based or WAP-based form supported by the network controller 300 or another associated server.

Referring to FIG. 5 a flowchart for displaying an enterprise number as a caller identification from a public network is discussed and described. The method provides a caller identification to a called party when a communication device 400 is accessible via a plurality of communication networks. A network controller 200 stores 500 multiple identifiers for one or more communication devices 400 supported on the network controller 200. It is likely that some of the identifiers stored on the network controller 200 are for different, otherwise unrelated communication channels, such as 114. These additional identifiers are commonly provisioned by an administration process when the communication device is added to the network. A default alternate identifier for use as a caller identification is typically programmed at that time.

The network controller 200 can, optionally, receive 502 a signal from the communication device 400 indicating which of the plurality of indicators to use as a second identifier for providing as a caller identification when calls are made by the communication device 400. This can be a signal comprised in the number string when making a call, such as currently done when blocking a caller identification or outside the calling process, such as through a website.

The network controller 200 receives 504 a communication and corresponding first identifier from the communication device 400. The communication may be received by a public cellular network wherein the corresponding first identifier is a cellular telephone number. The network controller 200 then selects 506 a second identifier from the plurality of identifiers associated with the communication device 400. The selection can be based on input from the communication device 400, as at 502 or based on another criteria, such as an economic consideration for receiving a response communication from the called party. The network controller 200 provides 508 the second identifier as the caller identification to the called party when connecting the communication.

Referring to FIG. 6 a flowchart for receiving a return communication when an enterprise number is used as a caller identification is discussed and described. Following a call connected to a calling party as described in the method of FIG. 5 a response communication is received 600 from the called party by a second network controller 300 using the second identifier provided at 508. The network controller 300 determines 602 if the communication device 400 is in a coverage area 116 of its associated communication channel 114, e.g. does the unit respond to a page or is it registered, for example. If the communication device 400 is found the yes branch is followed and the communication is connected 604 to the communication device 400. If the communication device 400 is not found in the coverage area of the communication channel 114 the no branch from 602 is followed and the communication is forwarded 606 to the communication device 400 using the first identifier on a first communication channel 106. The communication device may signal the network controller 300 to block calls to the communication device 400 as set by a signal from the communication device 400 or by another system operator or function.

The methods and apparatus discussed above, and the inventive principles thereof are intended to and will alleviate problems caused when communication devices 104, 112 can operate on more than one, sometimes overlapping, communication infrastructure or network. Using these principles of defining and managing by a user what number will be selected or used as a caller identification will simplify call management and help manage costs for mobile professionals. One of the principles used is that a caller identification can be selected so calls are always directed to the lowest cost network. Calls and other communications are forwarded to the more costly network, usually with wider coverage, only when the communication device 400 is not accessible on the lower cost network. This dramatically reduces the number of calls made via the higher cost network without sacrificing accessibility.

A further benefit offered is to allow a user or system administrator a level of control of calls not normally available to a subscriber of a public wireless network carrier. Smaller, local network communication infrastructures, such as 108, can advantageously allow call screening, forwarding and blocking on a granular level of time of day, date, and origin not generally available elsewhere.

Various embodiments of methods and apparatus for managing calls in multiple communication infrastructure environments have been discussed and described. It is expected that these embodiments or others in accordance with the present invention will have application to many wide area networks that support communication devices capable of operation on multiple networks. The disclosure extends to the constituent elements or equipment comprising such systems and specifically the methods employed thereby and therein. Using the inventive principles and concepts disclosed herein advantageously allows or provides for call management and forwarding which will be beneficial to users and providers a like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A network controller for providing a caller identification to a called party comprising:
   a receiver for receiving a communication and a corresponding first identifier from a communication device;
   a controller, coupled to the receiver, for selecting a second identifier from a plurality of identifiers, each of the plurality of identifiers corresponding to the communications device and wherein the controller selects the second identifier based on economic considerations for receiving a response communication; and
   a transmitter coupled to the controller for providing the second identifier as the caller identification to the called party.

2. The network controller of claim 1 wherein the receiver receives a signal from the communication device indicating which of the plurality of identifiers for the controller to select as the second identifier.

3. The network controller of claim 1 wherein a second communication for the communication device that is addressed with the second identifier is forwarded from an other communication infrastructure to the receiver and addressed with the first identifier.

4. The network controller of claim 1 wherein the receiver receives the communication from one of a private wireless network and a public wireless network.

5. A communication device arranged and constructed for use with a plurality of communication networks comprising:
   a memory for storing a plurality of identifiers corresponding to the communication device;
   a controller, coupled to the memory, for selecting one of the plurality of identifiers based on economic considerations for receiving a response communication; and
   a transceiver apparatus, coupled to the controller, for providing to one of the plurality of communication networks the one of the plurality of identifiers for use as a caller identification.

6. The communication device of claim 5 wherein:
   the transceiver apparatus is operable to communicate on each of the plurality of communication networks; and
   the plurality of identifiers comprises a unique identifier for the each of the plurality of communication networks.

7. The communication device of claim 5 wherein the plurality of communication networks comprises one of a public network and a private network.

8. The communications device of claim 5 further comprising:
   a user interface for displaying the plurality of identifiers wherein the controller is responsive to a user indication of the one of the plurality of identifiers for selection as the caller identification.

9. The communication device of claim 5 wherein the controller sends a signal to one of the plurality of communication networks to block communications to the communication device from the one of the plurality of communication networks.

10. A method for providing a caller identification to a called party when a communication device is accessible via a plurality of communication networks comprising:
    receiving a communication and corresponding first identifier from the communication device;
    selecting a second identifier from a plurality of identifiers associated with the communication device based on economic considerations for receiving a response communication from the called party; and
    providing the second identifier as the caller identification to the called party.

11. The method of claim 10 further comprising:
    receiving a signal from the communication device indicating which of the plurality of indicators to use as the second identifier.

12. The method of claim 10 wherein the receiving the communication further comprises:
    receiving the communication by a public cellular network wherein the corresponding first identifier is a cellular telephone number.

13. The method of claim 10 further comprising:
    receiving a response communication from the called party on a second communication network using the second identifier provided;
    determining if the communication device is in a coverage area; and
    connecting the communication to the communication device if the communication device is in the coverage area.

14. The method of claim 10 further comprising:
    forwarding the communication to the communication device using the first identifier on a first network if the communication device is not in the coverage area.

15. The method of claim 10 further comprising:
    storing a plurality of unique identifiers for the communication device corresponding to each of the plurality of communication networks.

* * * * *